United States Patent
Smutko et al.

(10) Patent No.: US 11,481,420 B2
(45) Date of Patent: Oct. 25, 2022

(54) SYSTEMS AND METHODS FOR ANALYZING COMPUTER INPUT TO PROVIDE NEXT ACTION

(71) Applicant: NICE Ltd., Ra'anana (IL)

(72) Inventors: Ariel Smutko, Rehovot (IL); Aviv Yehezkel, Ramat-Gan (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 16/535,868

(22) Filed: Aug. 8, 2019

(65) Prior Publication Data

US 2021/0042338 A1 Feb. 11, 2021

(51) Int. Cl.
*G06F 16/338* (2019.01)
*H04L 51/02* (2022.01)
*G06F 16/332* (2019.01)
*G06F 11/34* (2006.01)
*G06F 16/33* (2019.01)

(52) U.S. Cl.
CPC ........ *G06F 16/338* (2019.01); *G06F 11/3438* (2013.01); *G06F 16/3326* (2019.01); *G06F 16/3344* (2019.01); *H04L 51/02* (2013.01)

(58) Field of Classification Search
CPC .............. G06F 16/338; G06F 11/3438; G06F 16/3326; G06F 16/3344; H04L 51/02
See application file for complete search history.

(56) References Cited

U.S. PATENT DOCUMENTS

| | | | |
|---|---|---|---|
| 2010/0121859 A1 | 5/2010 | Maeda et al. | |
| 2015/0154526 A1 | 6/2015 | Yates et al. | |
| 2017/0032417 A1* | 2/2017 | Amendjian | G06Q 30/0254 |
| 2017/0262899 A1 | 9/2017 | Geraghty et al. | |
| 2018/0225583 A1* | 8/2018 | Chen | G06F 9/445 |
| 2018/0302302 A1* | 10/2018 | Doggett | G06F 8/61 |
| 2019/0025851 A1* | 1/2019 | Ebrahimi Afrouzi | G05D 1/0219 |
| 2019/0087691 A1* | 3/2019 | Jelveh | G06K 9/6254 |
| 2019/0180218 A1 | 7/2019 | Vigneswaran | |
| 2019/0384657 A1* | 12/2019 | Chen | G06F 9/452 |
| 2020/0104169 A1 | 4/2020 | Powell | |
| 2020/0125586 A1* | 4/2020 | Rezaeian | G06F 16/2365 |
| 2020/0134488 A1* | 4/2020 | Kim | G06N 5/046 |

(Continued)

OTHER PUBLICATIONS

Marufuzzaman, Mohd, and Mamun Bin Ibne Reaz. "Hardware simulation of pattern matching and reinforcement learning to predict the user next action of smart home device usage." World Applied Sciences Journal 22.9 (2013): 1302-1309. (Year: 2013).*

(Continued)

*Primary Examiner* — Andrew T Chiusano
(74) *Attorney, Agent, or Firm* — Pearl Cohen Zedek Latzer Baratz LLP

(57) ABSTRACT

A system and method may analyze computer actions on a computer desktop system. Using a data gathering process, a low-level user action information item, describing input by a user (e.g. to the computer desktop system), may be received or gathered. The low-level user action information item may include an input type description and screen window information. Based on a series of low-level user action information items, a process a computer is engaging in with the user may be estimated or determined. The best or most appropriate next low-level user action may be displayed or suggested to the user, e.g. on a computer desktop system to a user.

22 Claims, 6 Drawing Sheets

(56) References Cited

U.S. PATENT DOCUMENTS

| | | | |
|---|---|---|---|
| 2020/0151826 A1* | 5/2020 | Ghaffar | G06Q 30/0202 |
| 2020/0225583 A1 | 7/2020 | Yoshida et al. | |
| 2020/0233865 A1* | 7/2020 | Myers | G06F 16/9035 |
| 2020/0410392 A1* | 12/2020 | Verma | G06F 9/453 |

OTHER PUBLICATIONS

Chandak, Yash, et al. "Learning action representations for reinforcement learning." International conference on machine learning. PMLR, 2019. (Year: 2019).*

Dezfouli, Amir, and Bernard W. Balleine. "Habits, action sequences and reinforcement learning." European Journal of Neuroscience 35.7 (2012): 1036-1051. (Year: 2012).*

Agrawal et al., "Mining Sequential Patterns", Proceeding of the 11th International Conference on Data Engineering. CA: Los Alamitos, IEEE Computer Society, pp. 3-14, 1995.

Deisenroth et al., "PILCO: A Model-Based and Data-Efficient Approach to Policy Search", In Proceedings of the 28th International Conference on machine learning (ICML-11), pp. 465-472, 2011.

Kyron, "Automated Business Process Discovery", retrieved Sep. 6, 2019 from https://www.kryonsystems.com/process-discovery/.

Mnih et al. "Human-Level Control Through Deep Reinforcement Learning", Nature, 518(7540), pp. 529, 2015.

Pei et al., "Mining Sequential Patterns by Pattern-Growth: The Prefixspan Approach", IEEE Transactions on Knowledge and Date Engineering, 16(11), pp. 1424-1440, 2004.

Saputra, "Mining Sequential Patterns Using I-PrefixSpan", Proceedings of World Academy of Science, Engineering and Technology, vol. 26, ISSN 1307-6884, pp. 499-504, Dec. 2007.

Van Hasselt et al., "Deep Reinforcement Learning with Double Q-Learning", Proceedings of the Thirtieth AAAI Conference on Artificial Intelligence (AAAI-16), pp. 2094-2100, 2016.

Xu et al., "Analysis of Web Access Sequence Based on the Improved PrefixSpan Algorithm", International Industrial Informatics and Computer Engineering Conference, pp. 788-791, 2015.

* cited by examiner

SYSTEMS AND METHODS FOR ANALYZING COMPUTER INPUT TO PROVIDE NEXT ACTION

FIELD OF THE INVENTION

The present invention relates generally to analysis of computer usage; in particular analysis of computer usage in order to provide a suggestion for a next user action or input.

BACKGROUND OF THE INVENTION

Companies and organizations such as call centers, or other businesses, may want to identify for users, e.g. company employees or agents, the best (given the available data) next action or input for the user to execute when working with computer applications. Doing so typically requires obtaining data on user actions and inputs and analyzing those actions. However, data regarding user actions and input to computer applications or programs may be difficult to obtain and analyze. This may be because, for example, some applications do not allow other applications access to user input or actions; or different applications may provide user input data in different formats, presenting a standardization problem.

Robotic process automation ("RPA") robots or bots may be software tools which may gather data on a user performing a task via a specific application's graphical user interface (GUI), and perform the automation by repeating those tasks directly in the GUI. Such robots may work "attended" or "unattended". In unattended mode, robots may execute tasks and interact with applications independent of human involvement. Attended mode is typically targeted toward front-office activities, and may be useful when the entire end-to-end process cannot be automated. In such cases RPA robots can work alongside humans to deliver attended automation (which may include explicitly guiding a human agent through a process). The actions of RPA bots can still be triggered by system-level events (as opposed to low-level actions) that can give and take data to and from human workers.

Attended bots may guide a human agent continuously, suggesting to the user the most relevant next action to execute. Existing solutions focus on tailoring attended solution for well-defined scenarios of specific processes. However, as processes tend to have various variations, exceptions, and can be changed over time, such specific tailor-made solutions may fail, and are not easily generalizable to different applications.

SUMMARY

A system and method may analyze computer actions on a computer desktop system. Using a data gathering process, a low-level user action information item, describing input or action by a user (e.g. to the computer desktop system), may be received or gathered. The low-level user action information item may include for example an input type description and screen window information. Based on a series of low-level user action information items, a process a computer is engaging in with the user may be estimated or determined. The best or most appropriate next low-level user action may be displayed or suggested to the user, e.g. on a computer desktop system to a user.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1A:
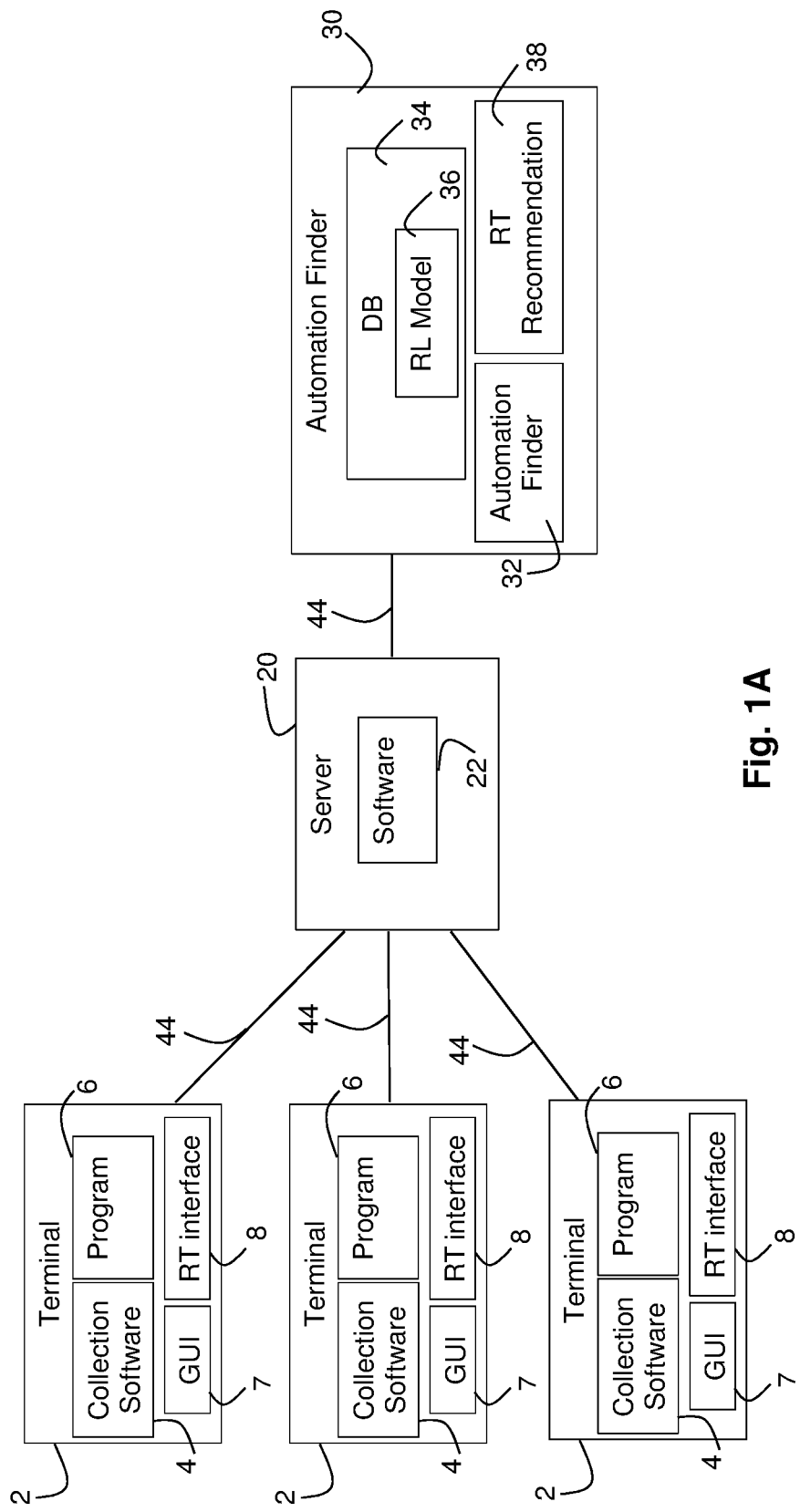
FIG. 1A is a block diagram of a system for providing a next action according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments may "auto-complete" user input or actions, or provide a recommended next best or recommended action, for example by first learning the next most best user-action at each timestamp based on the currently executed action, and then providing a user action or a recommendation for an action. Embodiments may learn what user input or actions to suggest or "auto-complete" user-actions from low-level desktop events, as opposed to application-specific information, and thus may be agnostic to the different enterprise or other applications. Prior art user-monitoring applications may be able to collect data only from certain programs or applications; by collecting low-level user actions, embodiments of the present invention may collect all user actions and inputs, regardless of application type, and regardless of whether or not the application is an Internet browser-based application or not. Some embodiments may provide an improvement over prior art in not requiring integrations or interfaces to multiple different specific applications. Embodiments may use low-level input data to provide a realistic and detailed understanding of users' actions. Embodiments may determine the most recommended action from low-level input data, despite such data making a determination difficult.

By using low level event data (e.g. describing user actions), embodiments of the present invention may be agnostic to the different enterprise or other applications used and providing input, and may not require integrations to or knowledge of a number of applications. Embodiments may gain a realistic and detailed understanding of a user's actions by using low-level input data. Embodiments of the invention may work without high-level system-specific event logs and may instead use low-level user input data, without being associated (e.g. directly associated via a case ID) to activities or process instances. Prior art processes to analyze users' actions relative to computer processes focus on a high-level view, and do not and cannot take into the account the actual actions a user takes in order to complete a specific step in a process. For example, high-level system specific event logs used in prior art processes may include a case identification (ID) which may specifically identify the process or program instance, e.g. a number, and an activity ID (e.g. a unique identifier of each activity in a process) which may specify or identify the task that has been performed by a user or a computer system. In contrast, the low level event data recorded and used in embodiments of the present invention may not be associated with a specific process (e.g. case ID) or activity but rather may be associated only with a window which has a name and with a program or application operating the window (e.g. an internet browser). The title (e.g., the label displayed at the top) of the screen window, and the name of the program executing with which the user is interacting are data may be extracted or obtained and are different from, the specific identification of the process or program instance which in some cases may not be obtained. Event log data such as an activity ID may be data internal to a program, and may not be provided to other programs; in contrast data such as window names may be more accessible and agnostic to the various programs and applications.

Technologies exist to obtain high-level system-specific event logs as input data, such as case ID (e.g. "Process ID"), activity ID and, timestamp to identify user activity or input. A case ID may identify the process instance and an activity ID may specify the task that has been performed as part of the process. Such data is typically provided by the application itself, and may not be provided for all applications, and thus a process using this data works with incomplete data. Data such as an activity ID, user selection and input may be data internal to a program, and may not be provided to other programs. Current processes analyzing user actions or input do not use accessible low-level desktop events as input data; such low-level data may not be associated with a specific process (e.g. case ID) but rather may be associated only with a window and a program operating the window (e.g. an internet browser).

Since the use of low-level input data may make the problem of analyzing user input or actions much harder, prior art processes typically do not use low-level input data. For example in order for such low-level user activity or input data to be performed by a human, the person would need to manually find all the possible sequences of actions in the input data (typically containing millions of actions and as thousands of sequences). A person would have to manually find all the different actions in the data determine the best or recommended action for each sequence. This manual process would require impractical human processing time.

Embodiments of the invention may analyze data (e.g. low-level user action information items) describing actions of human-computer interaction, such as user input events to a GUI. In such a manner—analyzing only user input events and their context—a broad set of data may be gathered, more than with prior art processes. The data may be analyzed to create a model which may provide a best, most desirable or most efficient next action, given the current state of the computer process the user is interacting with. In one embodiment data is gathered or received from multiple physically distinct user terminals operated by multiple different users, and is analyzed at a central location or server not at any of the user terminals (typically be a processor separate from terminal processors); however the data analysis discussed herein may be performed at a user terminal which also collects user data. At for example a central server data received from the terminals describing the low-level user action information or items may be used to create, use and update a model.

An item of information describing or defining a low-level user action may include for example an input type description or desktop event (e.g. the type of action the user performed as input: mouse click, left click, right click, cut, copy, paste, typing text, tab, etc.), a user name, and screen window information such as title or name. (e.g., as computer processes in this context may be displayed as windows, each window may have a title or name which may describe the user-facing application to which the user provides input.) Actions may be stored and identified both identifying the specific unique (within the system) instance of the action, and also a generalized name or description that identifies the action in a way such that actions of similar functionality will have the same generalized name. Both the specific and generalized identification or name may be linked or stored together in the system.

Embodiments may learn from users' past actions using a novel reinforcement learning (RL) model. In one embodiment, input may be a log or database of desktop actions, e.g. user input or actions to a GUI for a variety of applications performed by one or more employees. Data describing an action may include for example action data or input type descriptions (e.g. describing whether the input is via mouse or keyboard, or what type or input such as left click, right click, cut, paste, typing text), timestamp, application context, user name, screen window information such as title or name (e.g., as computer processes in this context may be displayed as windows, each window may have a title or name which may describe the user-facing application to which the user provides input), and where possible, field context.

A large amount of action data may be collected; e.g. in some implementations there are approximately 10,000 actions per user, across many users, on average 8-hour work day. An embodiment may create and use RL model which is learned or trained on past user actions data (e.g. offline). At each step, e.g. at each opportunity for user input, an embodiment may estimate the most best next action based on current and recently executed (e.g. discounted via a decay factor giving more importance to more recent actions, such as an exponential decay over the last 10 actions) user actions. An RL model may be continuously optimized by a user feedback loop per the estimated actions (e.g. by a user implicitly approving the suggestion or not, typically by taking the action or not).

An embodiment may, based on the current state of a user's interaction with an application and other information such as the prior user action or input, determine the most probable, or best or most efficient, next user action or input. User actions or input may be collected from user computers or terminals using, for example, client data collection software which may receive, gather or collect a user's desktop activity or actions, e.g. low-level user action information or descriptions. A module may provide a recommended next user action or input, which the user may opt to perform or not. A recommendation may be provided, for example, via a popup or other notice appearing on the display of a user terminal or computer. The module providing a next user action may be continually updated based on user actions, the model gathering feedback from user actions.

Figure 1B:
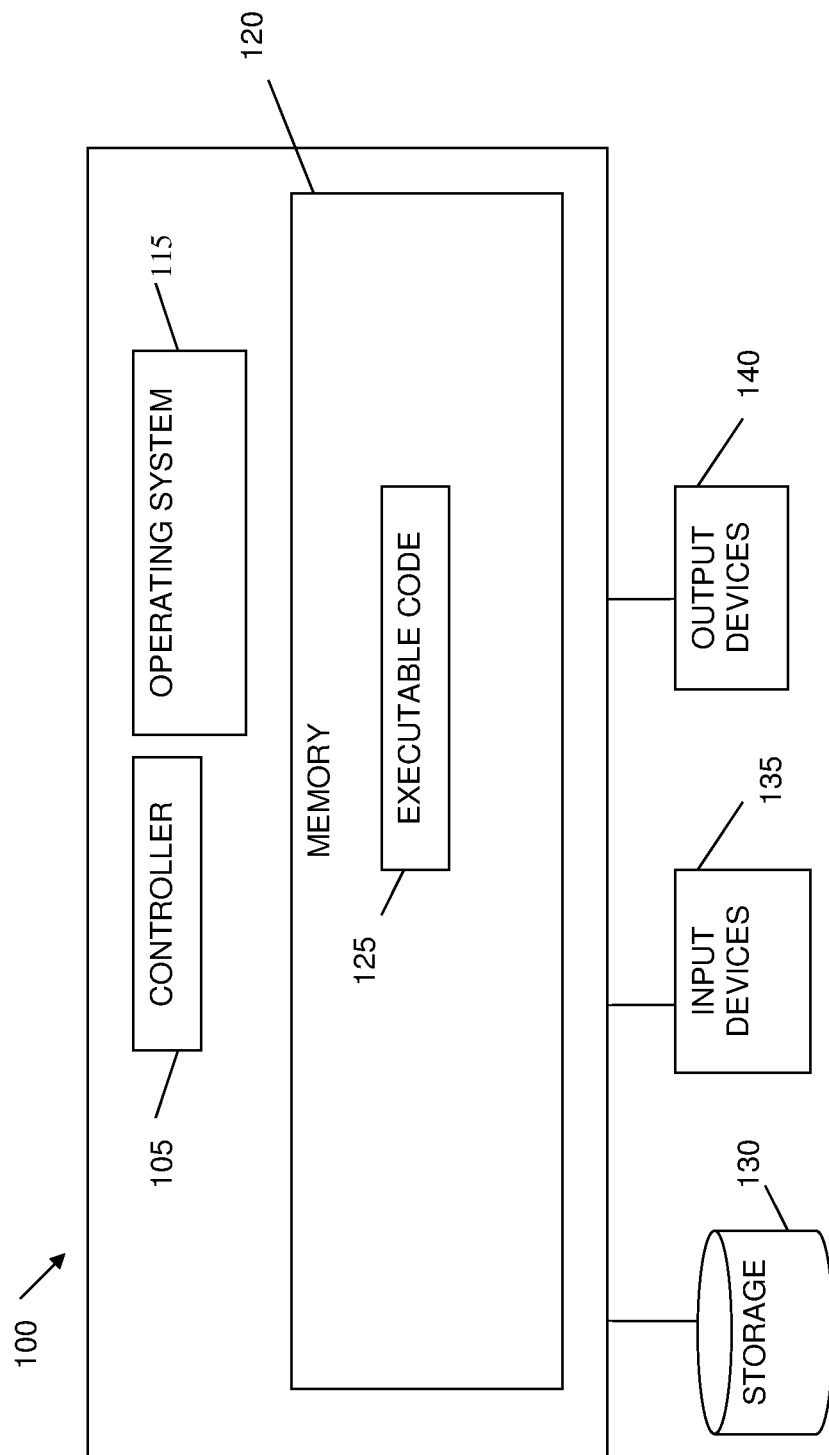
FIG. 1B is a high-level block diagram of an exemplary computing device which may be used with embodiments of the present invention.

FIG. 1A is a block diagram of a system for providing a next action according to an embodiment of the present invention. While FIG. 1A shows such a system in the context of a contact center, embodiments of the invention may be used in other contexts. A number of human users such as call-center agents may use agent terminals 2 which may be for example personal computers or terminals, each including components such as shown in FIG. 1B. Terminals 2 may include one or more software programs 6 to operate and display a computer desktop system 7 (e.g. displayed as user interfaces such as a GUI). In some embodiments, software programs 6 may display windows, e.g. via desktop system 7, and accept user input (e.g. via desktop system 7) and may interface with server software 22, e.g. receiving input from and sending output to software programs 6. A real-time (RT) recommendation local interface 8 executing on terminals 2 (e.g. a NICE Attended Robot provided by NICE, Ltd.) may provide or display a recommended next action to user for example by applying a current action and state to a model and/or interacting with a real-time recommendation engine 38 which may apply an action and state to a model to determine a recommendation. Real-time recommendation local interface 8 may be executed on or by terminals 2. Programs 6 may be executed by or on terminals 2 and server software 22 may be executed by server 20, and software 22 and programs 6 may interact in a client-server manner. Real-time recommendation engine 38 and real-time recommendation local interface 8 may communicate (e.g. via one or more networks 44) and cooperate (e.g. in a client-server manner) to develop and maintain one or more models used for a next action recommendation, recommend a next action, and update models based on actual user actions. While in the example embodiment shown, real-time recommendation engine 38 and real-time recommendation local interface 8 are separate processes with certain functions, in other embodiments the functions of each may be elsewhere; for example maintaining, using and updating a model may be performed by a process executing on a terminal 2.

Client data collection software 4, e.g. the NICE RT™ Client software, an Activity Recorder or Action Recorder, may execute on or by terminals 2 and may monitor input to programs 6. For example client data collection software 4 may receive, gather or collect a user's desktop activity or actions, e.g. low-level user action information or descriptions, and send or transmit them to a remote server 20, e.g. a NICE RT™ Server. Client data collection software 4 may access or receive information describing user input or actions via for example an API (application programming interface) interface with the operating system and/or specific applications (e.g. the Chrome browser) for the computer or terminal on which it executes. Remote server 20 may collect or receive data such as user action information or descriptions, combine actions into a file, and export them as for example JSON (JavaScript Object Notation) files via for example an HTTPS (Hypertext Transfer Protocol Secure) connection to an automation finder server 30, which may receive and store action data and other data in a database 34, which may be processed by automation finder 32. Automation finder 32 may discover processes for use for example by a real-time recommendation engine 38, and may be for example a process executed by server 30 or another computer. A reinforcement learning (RL) model 36 (in some embodiments stored in database 34) may be based on past user actions and may be used by real-time recommendation engine 38 to predict future user actions, and may be included in a Real-Time Recommendations Cache, including models or tables as discussed herein. Real-time recommendation engine 38, for example executed by or on automation finder server 30, may update and use RL model 36.

In some embodiments server 20 and automation finder server 30 may be contained in or executed on the same computing device, unit or server, and automation finder server 30 may include a processor (e.g. as shown in FIG. 1B) separate from a processor executing collection software 4.

One or more networks 44 (e.g. the internet, intranets, etc.) may connect and allow for communication among the components of FIG. 1A.

Terminals 2 may be or include computing or telecommunications devices such as personal computers or other desktop computers, conventional telephones, cellular telephones, portable or tablet computers, smart or dumb terminals, etc. Terminals and servers 2, 20, and 30 may include some or all of the components such as a processor shown in FIG. 1B.

In one embodiment, client data collection software 4 may operate with permission of the organization operating terminals 2, and may collect for example user input event data, and may be tuned or configured to not collect certain data. For example a user may configure data collection software 4 to operate on or collect data from only certain windows and applications (e.g. windows with certain titles, or certain URLs (uniform resource locators) or website addresses), and may ignore for example windows accessing certain URLs or website addresses. Client data collection software 4 may collect data from Internet based windows and/or non-Internet based windows.

Real-time recommendation engine 38 may work in an "offline mode" where RL model 36 is learned or created based on upon past user actions, and the discovery of sequences and business processes data by automation finder 32. Real-time recommendation engine 38 may, at each "timestep" or relevant point in time (e.g. the receipt of an action) estimate the best next action using RL model 36 based for example on current and recently executed user actions. RL model 36 may be continuously (e.g. after each collected action) optimized or updated by a user feedback loop per the estimated actions (e.g. by a user approving the suggestion or not; approval may in one embodiment be a user making the action, and disapproval may be a user not making the action).

FIG. 1B shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of modules and equipment such as terminals 2, server 20, data collection software 4, software programs 6, RT interface 8, server software 22, automation finder processor 30, automation finder 32, RT recommendation engine 38 and other modules discussed herein may be or include, or may be executed by, a computing device such as included in FIG. 1B, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as low level action data, output data, etc.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 3 and 4, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as user action data or output data may be stored in a storage 130 and may be loaded from storage 130 into a memory 120 where it may be processed by controller 105. In some embodiments, some of the components shown in FIG. 1B may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 2:
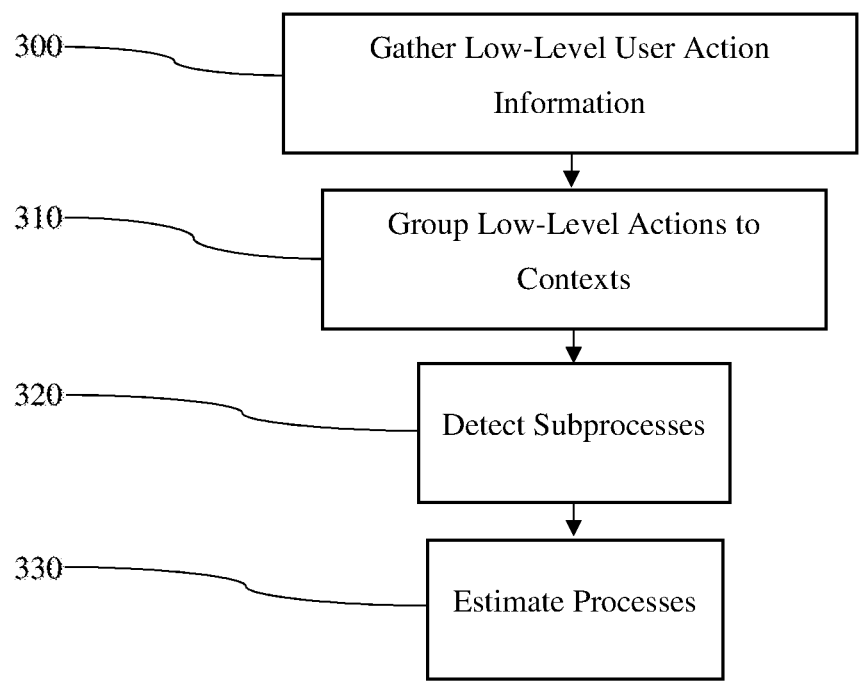
FIG. 2 is a flowchart of a method according to embodiments of the present invention.

Prior to developing a model for recommendations, user processes may be estimated, discovered or defined. A user process may be a series of actions taken repeatedly by different users, and may involve more than one program or application. A user process as discussed with respect to FIG. 2 is different from a specific process or program instance providing data regarding user input as described with respect to the prior art. FIG. 2 is a flowchart of a method for estimating, discovering or defining user processes according to embodiments of the present invention. While in one embodiment the operations of FIG. 2 are carried out using systems as shown in FIG. 1, in other embodiments other systems and equipment can be used.

Referring to FIG. 2, in operation 300, a data gathering process (e.g. client data collection software 4, such as the NICE RT Client produced by NICE, Ltd.) executed on or by a user or agent terminal such as terminal 2 (e.g. a computer as shown in FIG. 1B) may receive or gather computer or use activity data describing or related to low-level user action information or descriptions, e.g. displayed on and input to a computer desktop system. A low-level user action may refer both to the action itself, typically input by a user received by a computer, and the data that describes such an action, and in addition a generalized description or name for the action which applies to multiple specific instances of the same action or similar ones (in terms of their functionality). A specific set of data describing a low-level user action may be termed a low-level user action item.

A low-level user action or low-level user action item may be for example a mouse or other pointing device click, a keyboard input to a text field, a cut command, a paste command, a certain keystroke or set of keystrokes (e.g. ctrl-P, alt-F1, etc.). Data or information describing such user actions (e.g. a low-level user action item) may include for example the type or description of action item or an input item description (click, cut, paste, text entry, etc.); action component details (e.g. the title of window item to which input is applied, e.g. the name of the text field having text entered; the title of the button or control being clicked on, etc.); a user name or ID (e.g. the name of ID of the person providing the input or logged in to the computer or terminal); a time or timestamp of the action; screen window information such as the title of the screen window into which data is entered or on which the relevant data is displayed, and the name of the program or application executing with which the user is interacting (e.g. the program displaying the window such as the Internet Explorer browser).

A window may be for example a defined sub-area of the screen which may typically be resized and moved by a user, in which data is displayed an entered for a particular task or software program. For the point of view of the computer by which a window is displayed, a window may be a graphical control element including a visual area with a graphical user interface for the program it belongs to, typically rectangular. A window typically has a name displayed, typically at its top—for example, a window allowing a user to edit a text document may have a name or title including the filename of the document and the program being used to edit the document. A window may be related to two different software programs: the program or application executing the window, such as a browser such as Internet Explorer; and a remote or local program which controls or owns the substance of the window. The local or remote program executing the substance of the window may not provide adequate data, and thus embodiments may capture low level action data instead. In many cases, the name or title for a window may be accessible from the OS of the computer executing the program owning or displaying the window, while the program owning or displaying the window may not allow or provide access regarding its own name, function etc. via system-specific event logs.

Low-level user action information or description data (e.g. user action items) may be for example stored and/or transmitted to for example a server or other computer such as server 20. In one embodiment, data collected may be in the form of Windows Handles and their properties as provided by Windows API (e.g. Win-32). The event logs files describing these data collected desktop events collected by NICE RT Client may be exported using JSON files to server 20. Other low level event or action data may be used. The data may include for example event or action time (e.g. start time, but end time may also be included); user details (e.g. name or ID of the person providing the input or taking the action in conjunction with the computer); action details or description (e.g. mouse-click, text-input, keyboard command, etc.); the details of the window in which the action takes place, such as the window size, window name, etc.; the name of the program executing the window; and text if any that was input or submitted (in text actions). Other or different information may be collected. User details or ID may help to tie together actions to related processes and infer process orderings.

Each low-level user action may be described in a database by several fields of the action data such as action time, user details, action details, window name and size, program executing the window, and whether or not text was entered. A generalized name or description may also be created and associated with the action, as in a generalization process described elsewhere herein. A name may have certain specific information such as user ID, timestamp, and other tokens in the data (e.g., names, dates, etc.) removed or replaced with generalized information. Multiple specific instances of similar actions may share the same generalized name or description. Thus actions may be stored and identified by both identifying the specific unique (within the system) instance of the action, and also a generalized name or description.

Table 1 below depicts example action data for an example scenario in which the agent logs in into an ordering system; as with other data used in examples other specific data and data formats may be used. The agent may open or start the ordering system, enter her or his username and password in a login screen, and then continue working on a case e.g., move to the new orders screen. This includes several low-level user actions as described in Table 1. First, the agent, identified as Agent1 in the User column, at time 10:00:00, clicks twice using a mouse left-click on the MyOrdering-System icon on the desktop display (window Desktop indicates the desktop on a Windows style system, where windows may be displayed on the desktop). The login screen or window may open or pop up (named per collected data MyOrderingSystem-Login), and the agent may enter his username (e.g. "Agent1") and password (e.g. "myPassword") into the fields identified in the Action column, and successfully log in. The text collected as data may be the entered agent name and password. The agent may then click on mouse left-click on the NewOrders view inside the MyOrderingSystem to display new orders. A "window" may be labelled "Desktop" or another name if there is no "window" used, but rather the user takes action with respect to the desktop, the portion of the display behind or underneath windows

TABLE 1

| User ID | Time | Window Name | Action Description or Type | Text Entered |
|---|---|---|---|---|
| Agent1 | 10:00:00 | Desktop | Left-Dbl-Clickon MyOrderingSystem | |
| Agent1 | 10:00:10 | MyOrderingSystem-Login | InputText on Username | Agent1 |
| Agent1 | 10:00:20 | MyOrderingSystem-Login | InputText on Password | myPassword |
| Agent1 | 10:00:30 | MyOrderingSystem-MainView | Left-Click on NewOrders | |

In operation 310 low-level user actions may be grouped into or assigned to contexts, which may be for example a rough assignment of the business process or other functionality executed by the user while taking the associated action. This may be performed for example by applying a statistical algorithm, possibly using window information, e.g. the title of the window in which the action occurs or is entered. A context may be considered a contained process which includes subprocesses and actions. A subprocess may be a sequence of low-level actions, executed again and again (with different specific timing and/or user data in each instance), which share or occur in the same context. A context may be derived from window names in which user actions take place, in contrast with a subprocess which may be derived from a series of low-level actions repeated across specific instances of user interaction. Some embodiments may determine or identify one or more process contexts from the series of low-level user actions. An embodiment may be domain-agnostic and language-agnostic. A statistical-learning, TF-IDF (term frequency-inverse document frequency) based approach may be used, determining or creating a context according to frequent words in the window names used by the user (e.g., the screens that were used by the specific user during his work), but also dropping or not including "too-frequent" words (e.g. that appear too-frequently, e.g., in a high-fraction of the entire user actions data, across multiple users, as opposed to screens used by a specific user). In one embodiment, a context may be identified by analyzing the window names, for example, using the procedure: Context(sentence)={word if freq(word, sentence)>thresh_1 AND freq(word,data)<thresh_2 |word∈ screens(sentence)} where, for each "sentence", which may be the window titles names and the name of the program or application for a group of instances of actions which occur within a time window or time band, a context for that sentence is found. The relevant timestamp used for each action is typically start time, although start and end time may be used. A number of time-sequential sentences or groups of actions may be defined by action start time within the time band or time period, where the sentences or groups are typically not overlapping. The process described by Context(sentence)

may be performed iteratively once for each sentence. Context(sentence) may be a textual sentence, e.g. a string which is a concatenation of words, describing the context for the group of actions having their associated window names in the group "sentence". freq(word, sentence) may be the frequency, e.g., number of appearances of a "word" in the group "sentence". freq(word,data) may be the frequency, e.g., number of appearances of, "word" in the window names for all actions in the data set of action input data. thresh_1 and thresh_2 may be the TF-IDF thresholds, e.g. integers. screens(sentence) may be all the screen names in this group "sentence", namely, the screen names of all actions in the group defined by a certain time window.

A word may be a text string that is returned as a Context if its frequency "freq" (e.g. number of occurrences) across the screen name data in a sentence is greater than a threshold thresh_1 and if its frequency when used across all action data (across all contexts) is less than a number of occurrences thresh_2. Typically, sentence data over which a word is searched is sentence data for each particular instance of an action for a specific user.

For example, a user may take action in or use the following example screens or windows, with the first item in the pair being the name or title of the window or screen, and the second item in the pair being the name of the application or program owning the window (e.g., a "ServiceNow" application, internet browser such as Internet Explorer). The screen name information for the following actions may be used, where the actions are defined as being in the same sentence based on timestamp within a defined period or range:

Accounts, Passwords XYZ; Permissions |ServiceNow—Internet Explorer

Locked Account or Password Reset |ServiceNow—Internet Explorer

Request to reset domain (computer) password |ServiceNow—Internet Explorer

Other data or data formats may be used, as with other example data shown herein. XYZ may be a name or application or program name related to a specific entity or organization creating or operating the applications being analyzed. The above-described algorithm may identify or determine that the process context is "reset password", and the too-general (and probably too-frequent) "Service Now" and "Internet Explorer" terms may be removed. "Reset password" may be returned as being the two words that occur frequently within the window title information for the three actions used above, and which do not occur frequently across all window title information for all actions, across all users and all times (each sentence may be related to an action by a specific user at a specific time).

In operation 320 subprocesses may be detected within the set of low-level user actions; in some embodiments this may be done for each context. This may be performed for each context: e.g. within each context a number of subprocesses associated with that context may be discovered or defined. For example, each sentence (e.g. groups of specific instances of actions having start timestamps within a time window) may be assigned to a context, and the actions for sentences within a context may be used to define subprocesses for that context (typically ignoring sentence boundaries or divisions when subprocesses are found). A subprocess may be considered to be a common reoccurring sequence of actions, e.g. a series, possibly a time-ordered series or sequence, of low-level user actions which occurs multiple times across the dataset, but which may be detected as sharing the same context, e.g. the same series sequence of actions (typically using different specific data at least in their original, as-gathered, representation) recurring in different places. When finding subprocesses, the generalized names (e.g. with some features identifying the action instance such as user ID or timestamp removed) of actions may be considered.

Figure 3:
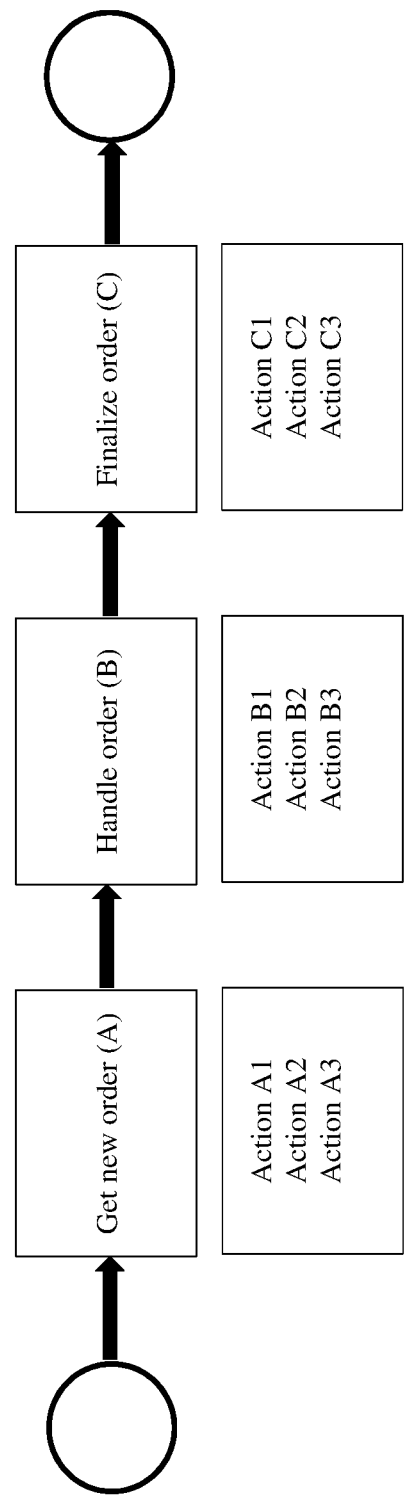
FIG. 3 is an example of a process including subprocesses according to embodiments of the present invention.

FIG. 3 is an example of data representing a process including subprocesses according to embodiments of the present invention. When used herein, events such as a process or low-level action may refer to the event itself and also to the data representing the event. In FIG. 3, an order handling process includes subprocesses (A), (B) and (C), each including low-level user actions (Action A1, A2, etc.).

In one embodiment, a modification of a sequential pattern mining algorithm (e.g. the known PrefixSpan algorithm) may be used to identify or determine, for each context, a set of subprocesses. Such algorithms may implement a bottom-up approach: action sequences of length 1 are found; then the algorithm continues iteratively such that the K-step begins with the (K-1)-length sequences that have passed a support-threshold threshold (namely, a minimum frequency threshold) and searches for sequence candidates of length K.

In some embodiments, instead of finding all the candidates in each iteration by scanning the data, an algorithm such as the PrefixSpan algorithm may find all the candidates at first place and then recursively pass through them until all the sequences are found. A PrefixSpan algorithm may return the complete set of sequences and their respective support (e.g. number of occurrences). One embodiment provides a modification to this inefficiency of the PrefixSpan algorithm to achieve an optimal resources-results tradeoff. Each user action may be described by or associated with a user action vector (e.g. an ordered list or series of numbers), for example an N dimensional vector, describing the action. Each subprocess may be described by or associated with a subprocess vector which may be generated from action vectors associated with low-level user actions which occur in the subprocess. An action vector for an action may be calculated or created for example a text string which is the generalized name for the action, where data related to a specific instance is removed or no considered. Text strings may be generalized using generalized names or tokens that represent entities such as person names, file names and ID numbers.

In operation 330 processes may be estimated, detected, inferred or created, for example by clustering or grouping the subprocesses into processes such as user function processes or business processes. For example, if the following example subprocesses are identified:

a. Password reset
b. Secured password generation
c. Request to new password
d. New distribution list
e. Add to distribution list The subprocesses may be clustered into a first process including subprocesses a, b and c (e.g. related to "reset password" process); and a second process including subprocesses d and e (e.g. related to "distribution list" process). Embodiments of the invention may accurately cluster different subprocesses into processes given only a small amount information about them: reoccurring sequences of actions.

A distance between each pair of vectors may be created or calculated, and that distance may be used to cluster vectors. Clustering may then be performed using the distances calculated. Each subprocess may be associated with a cluster such that subprocesses related to the same process (e.g. business process) are associated to the same cluster. This may be performed for example using a Louvain method for community detection which may find or determine clusters by maximizing the graph's modularity. Other suitable clustering or community detection methods may be used. Each subgroup may be initially set or seeded as a cluster. A calculation may be iteratively or repeatedly performed such that in each iteration or repetition, for each cluster, a modularity may be calculated for the cluster to determine which cluster maximizes the modularity of the graph of clusters.

Processes may be named. For example, the process name may be derived by the most common words in its subprocesses' names.

The operations of FIG. 2 are examples only, and different operations may occur in different embodiments.

In some embodiments, operations such as in FIG. 2 may result in a table or data structure including each actual action taken by a user, where each entry includes details on the actual action taken by a user, including the name or ID of the user, the time the action was taken (e.g. start or stop time or both), and a general or standardized name for the action (e.g. not including a user name or ID, and not including a time). Such a table may include the process in which each real or actual action takes place, or which each action is assigned. Such data—correlating real actions to data such as action time, user name, generalized name, and/or process assigned to an action—may be stored in one database or table, or a set of tables.

In some embodiments, a table or other data structure (an example of which is referred to herein as q* or q(s,a) may be populated with generalized versions of all collected actual action data, showing each pair of consecutive actions by any user as a state-action pair in a generalized form, where the first action in the pair describes the state the user's interaction with a computer was in before the second action takes place (multiple actual pairs of consecutive actions may correspond to such a generalized state-action pair). After a process iterates over received data, a total expected reward associated with each state-action pair may be determined based on a series of actual low-level user action information items, each associated with a process a computer is engaging in with the user. That q* or q(s,a) includes generalized versions may mean that multiple entries in all collected actual action data have one associated generalized entry in q* or q(s,a). Such state-action pairs may be found by accessing a table of all actual actions and defining a state-action pair as two consecutive actions (using timing data) taken by one person (using user name or ID data). Each state action pair in q* may have a "q value", or a total expected score or reward over time, with the q value or reward over time indicates how beneficial, according to certain metrics, taking the action (the second item in the pair) is when in the state (the first item in the pair). In one embodiment an initial (possibly randomized) reward may be set, and a process may iterate over all entries in a table of actual entries, for each state-action pair modifying the reward or q value for the state-action pair entry in the q* table corresponding to the actual state-action pair (e.g. where the generalized description of each of the actual state and action correspond to the generalized description in q*). The modification may be based on the existing q-value for the state-action pair in q*, a reward based on a transition from the state using the action, and the best or maximum q-value for the action (the second item in the pair) when considered a state and paired with a further action.

Referring back to example FIG. 3, as part of Event A, every day, a particular user (e.g. a call center agent) first may enter an ordering system to check if there are new orders: the agent opens the ordering system, fills-in username and password in the login screen, and then moves to the new orders screen. This step, though intuitive and simple, actually includes several low-level user actions such as the example in Table 1. First, the agent clicks twice on mouse left-click on the MyOrderingSystem icon over the desktop. Then, the login screen pops-up on the agent's screen or monitor, and the agent enter a username (e.g. "Agent1") and password (e.g. "myPassword") and successfully logs in. Finally, the agent clicks on mouse left-click on the NewOrders view inside the MyOrderingSystem to display new orders.

There are significant differences between the low-level process mining compared to the prior art process mining approaches which are based on event logs: each action is low-level, state-less and unlabeled, there is no information about its respective activity or process. In particular, the lack of case ID makes this problem unsupervised.

In some embodiments the input data Win-32 event logs files collected by a client process on an agent computer such as the NICE RT Client process, and exported using for example JSON files to a server. Such files may contain detailed information on the various desktop-events that were executed by the user, including, for example:

Action time

User details

Action details: e.g. mouse-click, text-input, keyboard command, etc.

Window details: e.g. window-size, window-name, etc.

Text that was submitted if any

A generalization process may ensure that actions with the same business functionality, or which are functionally equivalent in terms of use within an embodiment of the invention, are be considered as identical even though they may seem slightly different due to different details such as time or user ID. Such a process may improve model accuracy. Data such as Win-32 event logs of user's actions may be received or loaded from, e.g. the client data collection software 4 and the various fields may be extracted and stored in a database. An action may include the following example data fields (other or different fields may be used):

Action time;

User details (e.g. user ID, user name, etc.);

Action details: e.g. mouse-click, text-input, keyboard command, etc.;

Window details: window-size, window-name, etc.; and

Text that was submitted if any.

In addition, each action may be associated with a 'description' or string, which may summarize the action's information, for example in a text string, for example an action description or string may be "User Click(LeftClick) on Create New Employee in Internet Explorer". This string may be used as a unique identifier of the action's functionality such that different actions will be associated with a different description. For the following example action data:

Action time

10:00:10

User details

Agent1

Action details: is it mouse-click, text-input, keyboard command, etc.

InputText

Window details:

Application: Internet Explorer

Window Name: "MyOrderingSystem-Login"

Action Component: Username

Text that was submitted (in text actions)

"Agent1"

the following description may be created (a description may be in other formats).

"User InputText(Agent1) on Username in MyOrderingSystem-Login - iexplore"

The description may summarize the action's information, but may have unnecessary information (e.g. may be noisy) due to various tokens such as names, addresses, IP numbers, etc. For example, in the two following action descriptions:

"User InputText(Agent1) on Username in MyOrderingSystem-Login - iexplore"
"User InputText(Agent2) on Username in MyOrderingSystem-Login - iexplore"

both represent the same functionality of inserting username (e.g. Agent1, Agent2) in the Username field, but the two descriptions are different as each contains a different name. In order to be able to express the identity of the two different actions, a generalization process may substitute or replace the certain tokens or data items (e.g., the "name" token) with more general or placeholder descriptions, or remove certain tokens. For example, the above two descriptions can be both be generalized as the following single description or text string, which applies to both: "User InputText(NAME) on Username in MyOrderingSystem-Login—iexplore". While in one embodiment only names generalization (e.g. of a name or user ID field) is used, a similar generalization process may be performed for other fields as well. The generalization process may return for example, a database where each entry for a specific unique instance of an actions includes a field including a generalized name for that action that may be shared with other actions.

A model may be created based on action data. A model may be based on an internal reward assigned to an "agent", which may be a computer process using, creating or operating a model. For example, at each point in time, or at the time of each action by a user, either of which may be defined by a timestep t, agent current state is $S_t$ may be defined using for example the description or string defining of its previous executed action. For example, a user state may be defined by the action string "User InputText(Agent1) on Username in MyOrderingSystem-Login—iexplore". The user may execute a user-action $A_t$ (e.g., Left-clicks on the Reset-Password button). This user action may be used by a process to generate an internal rating, score, or reward $R_t$ with regards to its last executed action, which may rate that action in terms of whether the action was efficient or recommended. The use of a score may define a reward-mechanism which will purposely guide the user towards the most efficient process execution.

A model may be created or learned online, based on past agent actions while the users are not working, and may be updated online, while users are working. Using a learned model, the user's current process may be estimated or determined. While a user's actions continue within the same process, the reward will vary according to the time T (e.g. in seconds) taken to execute the action, e.g. according to the formula for the reward at time point t:

$$R_t = \frac{1}{T}$$

If the user deviates to another, different business process, the reward may be strongly negative, e.g. $R_t = -100$.

For example, if the user's computer system is operating a process (e.g. as estimated or determined based on user actions) of "reset password", then as long as the user continues progressing on this process, the agent analyzing the workflow will assign a score or reward after each action which is determined according to the duration of the action, e.g. the time from the completion of the last action for the user to the completion of the current action by the user:
  i. Action #1: 10 seconds, reward will be 1/10
  ii. Action #2: 2 seconds, reward will be 1/2
  iii. . . .

A score or reward based on time may be normalized to the type of action, as some actions may typically take longer than others. If the user then enters an action causing the computer system to deviate to a different process, e.g., an "add new user" process, then it's the score or reward may be a highly negative reward, e.g. −100, in order to make sure this deviation will be enforced.

Based on a model setup, an optimal policy $\pi^*$, may be found, a function that takes the current state to return the most efficient next-action. A state-action pair Q-function may take as input of a state-action pair and return a real value. A state may be defined as the last completed action, typically a description of a low-level action that includes information about the action itself and its context, e.g. window name, field name, program executing window (e.g. the Internet Explorer Browser) etc. The optimal Q-function $q^*(s, a)$ may be the expected total (e.g. cumulative) reward received by an agent starting in action a, if the user behave optimally afterwards. Therefore, $q^*(s, a)$ may be an indication for how good it is for a user to pick action a while being in state s. For any pair of state and action, $q^*$ returns the total reward of the "optimal" user who will behave optimally in order to maximize his reward (note a reward or score is an internal measure, typically not shown to the user inputting actions, but rather used by the computerized agent evaluating actions).

An agent—computer-implemented process predicting a best next user action—may have limited knowledge, such as the set of possible states and actions, and the current state. Thus, the agent, via a model, may actively learn through the experience of interactions with the environment.

In some embodiments, a modification of a known Q-Learning process may be used to learn the most desirable, effective or efficient next action for a user to take. An embodiment may approximate the state-action pairs Q-function from the samples of q(s, a), where s is a state and a is an action, that are observed during user interaction with a computer system.

In one embodiment, a table $\pi^*$ describing an optimal policy may be created. An example table $\pi^*$ is shown below in Table 2 and may include state/best next action pairs, where the state is defined be an action including as its description context for the action. For example, in one embodiment, data representation of an action, and data representation of a state, include what action was taken, what field if any (e.g. Username, Ordernumber), the action is taken in, the name of the window, and the program (e.g. Internet Explorer, the Excel spreadsheet program) operating the window.

TABLE 2

| State | Best next-action |
| --- | --- |
| User InputText on Username in MyOrderingSystem-Login - iexplore | User InputText on Password in MyOrderingSystem-Login - iexplore |
| User Copy(Ctrl + C) on OrderNumber in myExcelSheet.xls - EXCEL | User Paste(Ctr + V) on OrderNumber in MyOrderingSystem- Orders - iexplore |

A table q*, also termed q(s,a) may be created describing the optimal state action function: q* may be a table where each pair state-next action is paired with a reward or score. An example table q* is shown below in Table 3 which may include state/best next action pairs, each with an associated reward or score for taking that action.

TABLE 3

| State | Best next-action | Reward/q* value |
|---|---|---|
| User InputText on Username in MyOrderingSystem-Login - iexplore | User InputText on Passwordin MyOrderingSystem-Login - iexplore | 15 |
| User Copy(Ctrl + C) on OrderNumber in myExcelSheet.xls - EXCEL | User Paste(Ctr + V) on OrderNumber in MyOrderingSystem-Orders - iexplore | 10.5 |

To create q*, a table may be initialized with each state collected by the system (in a generalized form, e.g. with no specific user name) paired with a next action which at initialization is not the "best" action, with an associated q* value or reward initialized to a pre-set value, e.g. 0.5, or a random value, e.g. between 0 and 1. The initialized q* table may include a generalized form of each consecutive set of specific actions found for specific users (e.g. a consecutive set of actions taken or input by a specific user, the consecutiveness determined by timestamp for the actions); since q* includes generalized forms of states and actions, multiple actual state-action pairs in the real data may point to one generalized entry in q*. Initialization may be performed for generalized actions, and thus may be across data for all users having entered action data. Each action in q* may be a generalized form, e.g. with specific data such as a name or user ID generalized to a blank or common token, or removed. A learning rate parameter alpha $\alpha$ ($0<\alpha<1$) may be set or initialized. In one embodiment, $\alpha=0.5$ may be used.

For all collected actions, across all users, a learning process may iterate over the actions. For each action a which is a transition to a new state s' after or based on action a, the rating or reward r(s, a) in q* of taking action a when in state s may be modified or adjusted. A process may iterate over all actions in a given sequence (e.g. a time ordered sequence for a particular user) and initialize the reward or q value by for example reducing the reward based on the amount of time a user spends before taking the next action (the longer the user takes, the less desirable the action) and reducing the reward by an amount if the user switches processes. The following example formulas may be used to modify initial q/reward values:

$$q(s, a) = (1 - \alpha) \cdot q(s, a) + \alpha \cdot q_{obs}(s, a) \quad \text{eq. 1}$$

$$q_{obs}(s, a) = r(s, a) + \gamma \cdot \max_{a'} q(s', a') \quad \text{eq. 2}$$

$$r(s, a) = \begin{cases} \frac{1}{T}, & \text{Agent continues on the same process till its end} \\ -100, & \text{Agent deviated to different process} \end{cases} \quad \text{eq. 3}$$

For each sequential in time pair of actions for a specific user in actual data, a generalized state-action pair (s, a) in q* may be found (note a state and action may be described by the same data). The reward q(s,a), taken from q*, is multiplied by a learning parameter subtracted from 1 (1−α), and this is added to the learning parameter a multiplied by $q_{obs}$, a determination of future reward for the generalized state-action pair in q*. $q_{obs}$ may be calculated by adding a score r(s, α) which measures the benefit or desirability of taking action a while in state s (taking into account time taken for the action, and whether or not the action moved the state to a different process, e.g. if the process the state is associated with is altered by the action) to a factor gamma (γ, which may be a discount factor determining the importance of future rewards, as is known in Q-learning) multiplied by the maximum reward or q-value found in q* for the new state s' (which is the action a input into the process). The maximum reward or q-value is the state action pair s'-a' for a state s' (the action a) paired with the action a' in q* producing the highest reward or q-value (the current highest, as the values change as the process iterates). In eq. 2, s' and a' may indicate all the state/action pairs in the input data.

A gamma (γ) of 0 may make the process "opportunistic" by only considering current rewards, while a γ approaching 1 may make it strive for a long-term high reward. The learning rate or step size (denoted with alpha, α) may determine to what extent new reward information overrides old reward information. An α of 0 may result in no learning, while an α of 1 may cause a formula to consider only the most recent information.

r(s, α) may be 1/t if no process is changed, where t is the time taken to complete the action, which in one embodiment is the time from completion of the last actual action to the current actual action. r(s, α) may be negative—e.g. −100—if a process is changed from the state s to the action a. Both the time (t) and process associated with both the state and the action may be stored in a table or database associated with actions: each action may be associated with a specific description (e.g. including user ID and time), a general description, and a process. States may be associated with a process as described in FIG. 2, as states may be described as actions in such a table. Each state and action may be assigned a process, e.g. as per the operations of FIG. 2. Other specific equations may be used; for example computing reward r(s,a) may be performed in a different manner, and/or using different parameters (e.g. not −100).

From eq. 3, it can be seen that the reward is strongly negative if a new process is deviated to, and otherwise is the inverse of the time taken for the action. The q-value, which may be the quality or reward for the action, or the expected total reward across all future action by an agent starting in state s and action a, then behaving optimally afterwards till the process end may be calculated based on a formula such eq. 2, $q_{obs}$.

Since typically all user data is used to create q*, it can be considered that multiple user paths (multiple series of user actions input to an application), across different users, are used to modify the q-value or reward, and thus q* reflects multiple different user paths.

A database or table π* describing an optimal policy may be created based on q*. For each state s in q*, all entries in q* may be iterated over to find the s-a transition (e.g. the pair s-a) in q* with the highest transition probability, which may be considered the estimated probability from state s to action a. For each state s, all state action pairs in q* may be iterated over using eq. 4, and the action a producing the highest TRANSITIONPROBABILITY from state s, per eq. 4, is deemed to be the action with the highest probability: the pair s-a (where a has the highest TRANSITIONPROBABILITY) is placed in π*. Such a process is performed for each state s, so that π includes one s-a pair for each s in p*. At the beginning of the iteration "maxprob" may be set to zero, and at each iteration within a set of iterations for s, if the result of eq. 4 is greater than maxprob, maxprob is replaced by the result of eq. 4 and the action a deemed to have the highest probability is replaced by the action resulting in maxprob. Thus the action a producing maxprob, which is a highest (yet found) reward or q-score for that particular state is returned after iterating over all a paired with a given s.

$$TRANSITITIONPROBABILITY (CURRENTACTION, ACTION) = \frac{q(s, a)}{\sum_{a'} q(s, a')} \quad \text{eq. 4}$$

In eq. 4, the q-score of a given s is paired with a given a is divided by the sum of all q-scores for all a paired with the given s: s is fixed and a is iterated over. Another manner of selecting an s-a from q* to be placed in π* may be used.

Database or table π* may define a policy, and may pair each state s with the action a which has the highest probability per eq. 4 above, or the highest q*, which may be an indication of process efficiency: e.g. continuing with the same process is efficient, and completing actions quickly is efficient. When determining what action to select for suggestion to a user, the current state s may be input into database or table π* to find the best action a to suggest. The optimal policy π* may be learned offline and stored in, e.g. learning (RL) model 36 Real-Time Recommendations Cache (FIG. 1A). The optimal policy providing a recommendation to a given user may be thus based on user action information items gathered from many other users, including user processes associated with those actions and the time to complete information of those actions.

At runtime, when a user is providing input to an application or GUI, at each timestep or period defined by user input, a process such as a real-time recommendation engine 38 (FIG. 1A) may determine or estimate the next best user action based on current and recently executed user actions and propose it to the user using the optimal policy learned, e.g. according to π*(s), where s is current state of the agent.

While p* and π* are created using data specific to individual users and specific actions taken, p* and π* are generalized models, applicable to all users in a system and updated by all user action in a system.

The actual steps executed by users, e.g. user actions input to a user computer, may be used as feedback for real-time recommendation engine 38 (FIG. 1A) and enable continuous optimization of the RL model 36 model or models (e.g. p* and π*). RL model 36 may be updated for example by using a modified version of equations 1-4 above. For example equations 5-8 may be used:

$$q(s, a) = (1 - \alpha) \cdot q(s, a) + \alpha \cdot q_{obs}(s, a) \quad \text{eq. 5}$$

$$q_{obs}(s, a) = r(s, a) + \gamma \cdot \max_{a'} q(s', a') \quad \text{eq. 6}$$

$$r(s, a) = \begin{cases} r(s, a) + 10, & \text{proposed action was executed} \\ \frac{r(s, a)}{2}, & \text{proposed action was not executed} \end{cases} \quad \text{eq. 7}$$

$$TRANSITITIONPROBABILITY (CURRENTACTION, ACTION) = \frac{q(s, a)}{\sum_{a'} q(s, a')} \quad \text{eq. 8}$$

Equations 5 and 6 may be used as with similar equations 1 and 2 above, and reward may be calculated by:

If the action proposed or presented to the user was executed by the user after the recommendation, as the next user action, the previous reward for the state-action pair may be increased, e.g. by 10:

$$r(s, a) = r(s, a) + 10$$

If the action proposed was not executed as the next user action: its reward may be decreased for example by dividing in two:

$$r(s, a) = \frac{r(s, a)}{2}$$

In such a manner the optimal policy π*(s) may be updated according to actual steps executed by the user in runtime and the RL model may continuously improve. Other formulas, and other increases or decreases to a reward, may be used.

A process may first receive existing data, such as the tables or data structures π*(s) and q(s, α). For every new action executed by a user, e.g. every action input to a GUI or application, a next action may be recommended: e.g. the current state, typically described by a last completed action may be input to π*(s) which may output a recommended best next action. An action may be recommended by for example displaying a pop-up window or other communication on a screen or monitor associated with a user computer.

In response to the recommendation the user may take an action or provide input to an application or GUI on their computer—the action may be the recommended action, or a different action. The reward or other internal rating may be updated by increasing the reward if the recommended or proposed action was taken, and may be reduced if the recommended or proposed action was not taken.

An output or recommendation may be provided to a user in response to a user action by, for example, a process such as real-time recommendation local interface 8 which may, after a user action or input is received at a user computer (e.g. at program 6), and after a process (e.g. real-time recommendation engine 38) provides a recommended next action, may display a recommended action on a user display, e.g. via pop-up window or another process.

The user may choose an action and enter the action to the relevant application or GUI—in such a case choosing the suggested action or entering a different action may be considered a response. In one embodiment, a user may also, in addition provide input to the message displaying the next suggestion, e.g. accepting the suggestion (e.g. "Next", confirming the suggestion) or not accepting the suggestion (e.g. "No thanks", ignoring or cancelling the suggestion). The user's input, e.g. the user's actual action, or the user's feedback to the message may be used for feedback, e.g. π*(s) may be updated as described elsewhere.

Figure 4:
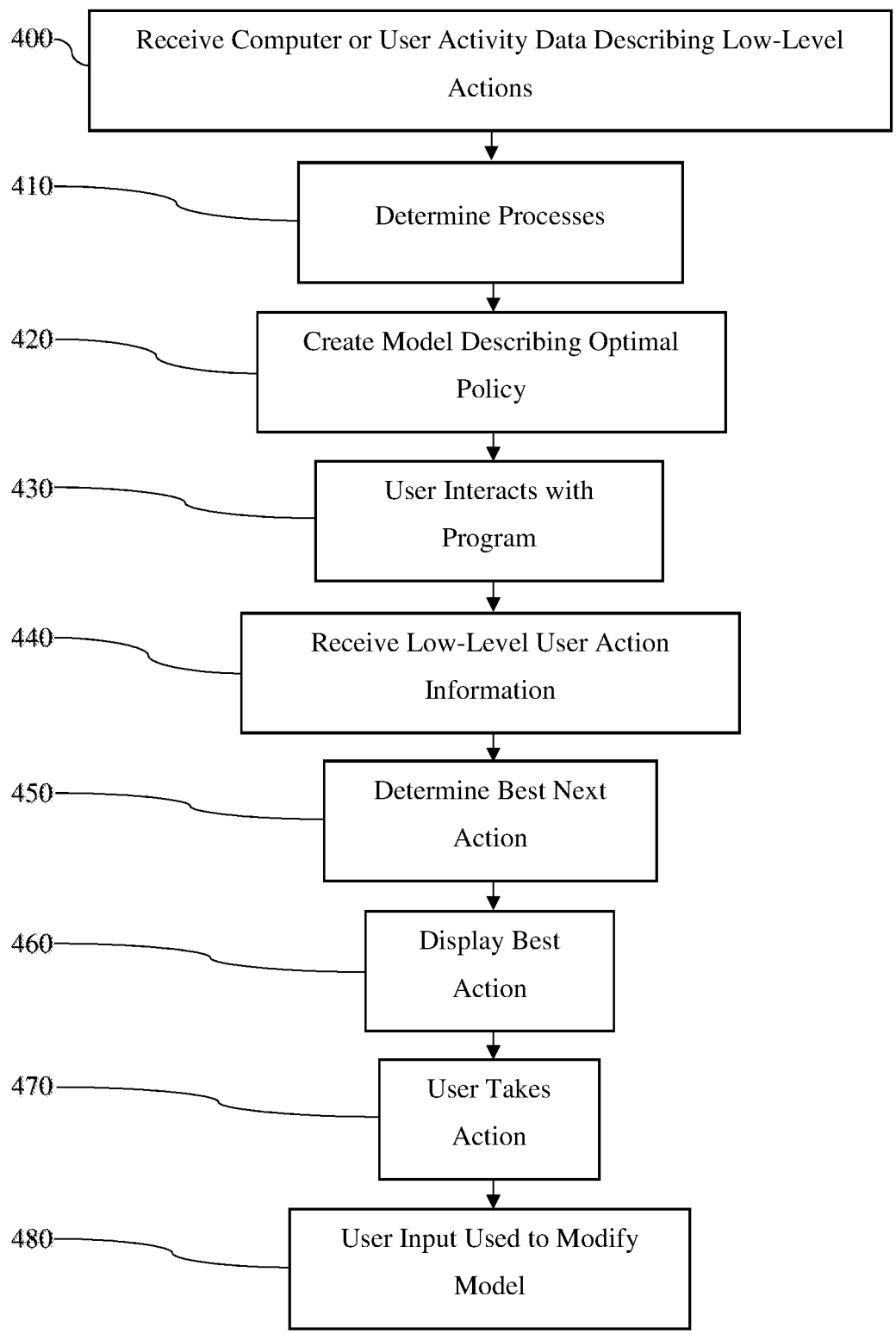
FIG. 4 is a flowchart of a method according to embodiments of the present invention.

FIG. 4 is a flowchart of a method according to embodiments of the present invention. In some embodiments, the operations of FIG. 4 may operate with modules and computer equipment such as shown in example FIG. 1, but in other embodiments other or different modules and equipment may be used.

In operation 400, a monitoring or data gathering process (e.g. client data collection software 4, such as the NICE RT Client produced by NICE, Ltd.) executed on or by a user or agent terminal such as terminal 2 (e.g. a computer as shown in FIG. 1B) may receive or gather computer or user activity data describing or related to low-level user action information or descriptions (e.g. low-level user action information item), which may be for example displayed on and input to a computer desktop system. Low-level user action information items may include for example an input type description and screen window information. In some embodiments, this may have been performed by, e.g. operation 300 of FIG. 2.

In operation 410, processes may be estimated, or discovered and named, for example using operations as described in FIG. 2.

In operation 420, a model may be created describing an optimal policy which determines, based on a state (e.g. a user's last action or interaction with an application or set of applications, with a description of a context, e.g. window, for the action), what the best or optimal next action or input by the user is. The optimal policy $\pi^*$ may be a table learned or built offline (e.g. before a user interaction begins) based on historical data collected prior to a user interaction begins, typically based on many different users, and may be stored for example in a Real-Time Recommendations Cache.

In operation 430, a user may begin interacting with a program or API on a user computer, such that the user performs actions, which may be received by a program or module such as GUI 7 or program 6.

In operation 440, a monitoring or data gathering process (e.g. software 4) on a terminal such as terminal 2 may receive or gather computer or user activity data describing or related to low-level user action information or descriptions (e.g. a low-level user action information item describing an action, or input to a computer, taken by a user). In one embodiment, action information may be collected at a timestep t.

In operation 450 a process (e.g. executed by server 30) may, based on the user or application state (which may be the last or previous action input by the user) and the low-level user action information item (e.g. the current action, which is after the action deemed to be the state), determine a best next low-level user action. This may be performed, for example, based on a table or model such as $\pi^*(s)$, described elsewhere herein. Each state-action pair in such a table may be chosen or determined based on a total expected reward associated with the state-action pair.

In operation 460, the best, or one or more recommended, next low-level user action(s) may be provided, e.g. displayed, to the user. For example, an RT recommendation local interface 8 may provide or display a recommended next action. In one embodiment, the recommendation may be derived from or be the action's description in a table or database such as $\pi^*$, e.g., "Copy TEXT from FieldA in ScreenB".

In operation 470, the user may take an action (e.g. enter data into a GUI), and/or may respond to a message as presented in operation 460, e.g. "click" or select an option or suggestion presented in operation 460. A process such as data collection software 4 and/or a program 6 may receive a user action.

In operation 480, the user's input, e.g. an actual action, or feedback to a message may be used to modify or update a model, e.g. $\pi^*(s)$, as described elsewhere herein. For example, after receiving a user input or response, in response to the displaying of the best next low-level user action, the table (e.g. $\pi^*$) may be modified based on the received user input.

Figure 5A:
FIGS. 5A and 5B are examples of output displayed according to embodiments of the present invention.
Figure 5B:

FIGS. 5A and 5B are examples of output displayed according to embodiments of the present invention. FIGS. 5A and 5B depict messages that may be displayed on a screen, for example as a pop-up, or in other forms. In FIG. 5A, the suggestion to a user is to choose the items and quantity to credit or return. In some embodiments, the user may accept (e.g. clicking on Next) or reject (e.g. clicking on No thanks) the suggestion, providing feedback. In FIG. 5B, multiple suggestions numbered 1-4 are provided to a user. In some embodiments, the user may provide feedback by clicking on the accepted item or action, or rejecting the suggestion by clicking on No thanks.

Embodiments of the invention may improve the technologies of computer automation, big data analysis, and computer use and automation analysis. Existing technologies and non-technology based techniques to analyze computer use data to identify or determine automation opportunities suffer from numerous drawbacks, as explained elsewhere herein. For example, existing technologies are not capable of using low-level desktop events as input data. A human attempting to perform such an analysis would be faced with an unreasonably large amount of data. This is, as a practical matter, impossible to be performed by a human. Embodiments of the present invention may include a practical application of a series of algorithms which result in user actions causing optimal use of computer applications. Some embodiments may be agnostic to the domain (e.g. the platform and specific programs as well as customer type, segment market, etc.) and language used for user interfaces, or other data, and may work with any data, for any specific programs the user interfaces with.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for analyzing computer actions on a computer desktop system, the method comprising using one or more computers:
using a data gathering process by data collection software executed by a processor on a first computer of the one or more computers, gathering a low-level user action information item describing input by a user to one of a plurality of software programs via a desktop system, the software programs separate from the data collection software, the low-level user action information item input to the desktop system and comprising an input type description, and screen window information;
based on the low-level user action information item and a current state of a user's interaction with a software program of the plurality of software programs, determining a best next low-level user action using reinforcement learning, wherein determining the best next low-level user action comprises choosing a state-action pair based on a total expected reward associated with the state-action pair, the total expected reward based on the amount of time a user spends before taking a next-action and normalized to the action taken by the user;
on the first computer, displaying the best next low-level user action; and
receiving a user input in response to the displaying of the best next low-level user action and modifying a table based on user input received in response to the displaying.

2. The method of claim 1, wherein determining a next best low-level user action comprises accessing the table.

3. The method of claim 1, wherein the modification increases an internal reward if the user executed the best next low-level user action and decreases the internal reward if the user did not execute the best next low-level user action.

4. The method of claim 1, wherein the low level user action information item comprises event time, user identification, action description, a description of the screen window in which the action takes place, and the name of the program executing the window.

5. The method of claim 1 comprising determining a total expected reward associated with a set of state-action pairs based on a series of actual low-level user action information items, each associated with a process the first computer is engaging in with the user.

6. The method of claim 1 wherein the reward is based on whether or not the action alters a process associated with the state.

7. The method of claim 1, wherein receiving a user input estimates the best next low-level user action based on an exponential decay of user actions.

8. The method of claim 1 wherein determining a best next low-level user action is based on an internal reward associated with the transition to a new state based on an action, where the reward is based on whether the action causes a deviation to a different process.

9. The method of claim 1 comprising performing an internal reward learning process which iterates over the actions, modifying the internal reward during the transition of the action to a new state.

10. The method of claim 1, wherein determining a best next low-level user action using reinforcement learning is built offline based on historical data.

11. A system for analyzing computer actions on a computer desktop system, the system comprising a memory and one or more computers configured to:
execute a data gathering process by data collection software executed on a computer to gather a low-level user action information item describing input by a user to one of a plurality of software programs via a desktop system, the software programs separate from the data collection software, the low-level user action information item input to the desktop system and comprising an input type description, and screen window information;
based on the low-level user action information item and a current state of a user's interaction with a software program of the plurality of software programs, determine a best next low-level user action using reinforcement learning, wherein determining the best next low-level user action comprises choosing a state-action pair based on a total expected reward associated with the state-action pair, the total expected reward based on the amount of time a user spends before taking a next-action and normalized to the action taken by the user;
on the computer, display the best next low-level user action; and
receive a user input in response to the displaying of the best next low-level user action and modify a table based on user input received in response to the displaying.

12. The system of claim 11, wherein determining a next best low-level user action comprises accessing the table.

13. The system of claim 11, wherein the modification increases an internal reward if the user executed the best next low-level user action and decreases the internal reward if the user did not execute the best next low-level user action.

14. The system of claim 11, wherein the low level user action information item comprises event time, user identification, action description, a description of the screen window in which the action takes place, and the name of the program executing the window.

15. The system of claim 11 wherein the one or more computers are configured to determine a total expected reward associated with a set of state-action pairs based on a series of actual low-level user action information items, each associated with a process the first computer is engaging in with the user.

16. The system of claim 11 wherein the reward is based on whether or not the action alters a process associated with the state.

17. A method for analyzing user-computer interaction on a computer desktop system, the method comprising:
gathering by data collection software a user action information item describing user input to one of a plurality of software programs via a desktop system, the software programs separate from the data collection software, the user action information item input to the desktop system and comprising an input type description, and screen window information;
determining a recommended next user action based on the user action information item and a current state of a user's interaction with a software program of the plurality of software programs using reinforcement learning, user action information items gathered from other users, and the user processes and time to complete information of the user action information items gathered from other users, each recommended next user action chosen based on a total expected reward associated with the next user action and normalized to the action taken by the user;
providing to a user the recommended next user action; and receiving a user input in response to the providing of the recommended action and modifying a table based on user input received in response to the displaying.

18. The method of claim 17, wherein determining a recommended low-level user action comprises accessing the table.

19. The method of claim 17, wherein the modification increases an internal reward if the user executed the recommended user action and decreases the internal reward if the user did not execute the recommended user action.

20. The method of claim 17, wherein the user action information item comprises event time, user identification, action description, a description of the screen window in which the action takes place, and the name of the program executing the window.

21. The method of claim 17 wherein the reward is based on whether or not the action alters the process associated with the state.

22. A method for analyzing computer actions on a computer desktop system, the method comprising using one or more computers:

using a data gathering process by data collection software executed by a processor on a first computer of the one or more computers, gathering a low-level user action information item describing input by a user to one of a plurality of software programs via a desktop system, the software programs separate from the data collection software, the low-level user action information item input to the desktop system and comprising an input type description, and screen window information;

based on the low-level user action information item and a current state of a user's interaction with a software program of the plurality of software programs, determining a best next low-level user action using reinforcement learning, wherein determining the best next low-level user action is based on an internal reward associated with the transition to a new state based on an action, where the reward is based on a user time to complete the action and whether or not the action alters a process associated with the state, and is normalized to the action taken by the user; and on the first computer, displaying the best next low-level user action.

* * * * *